UNITED STATES PATENT OFFICE.

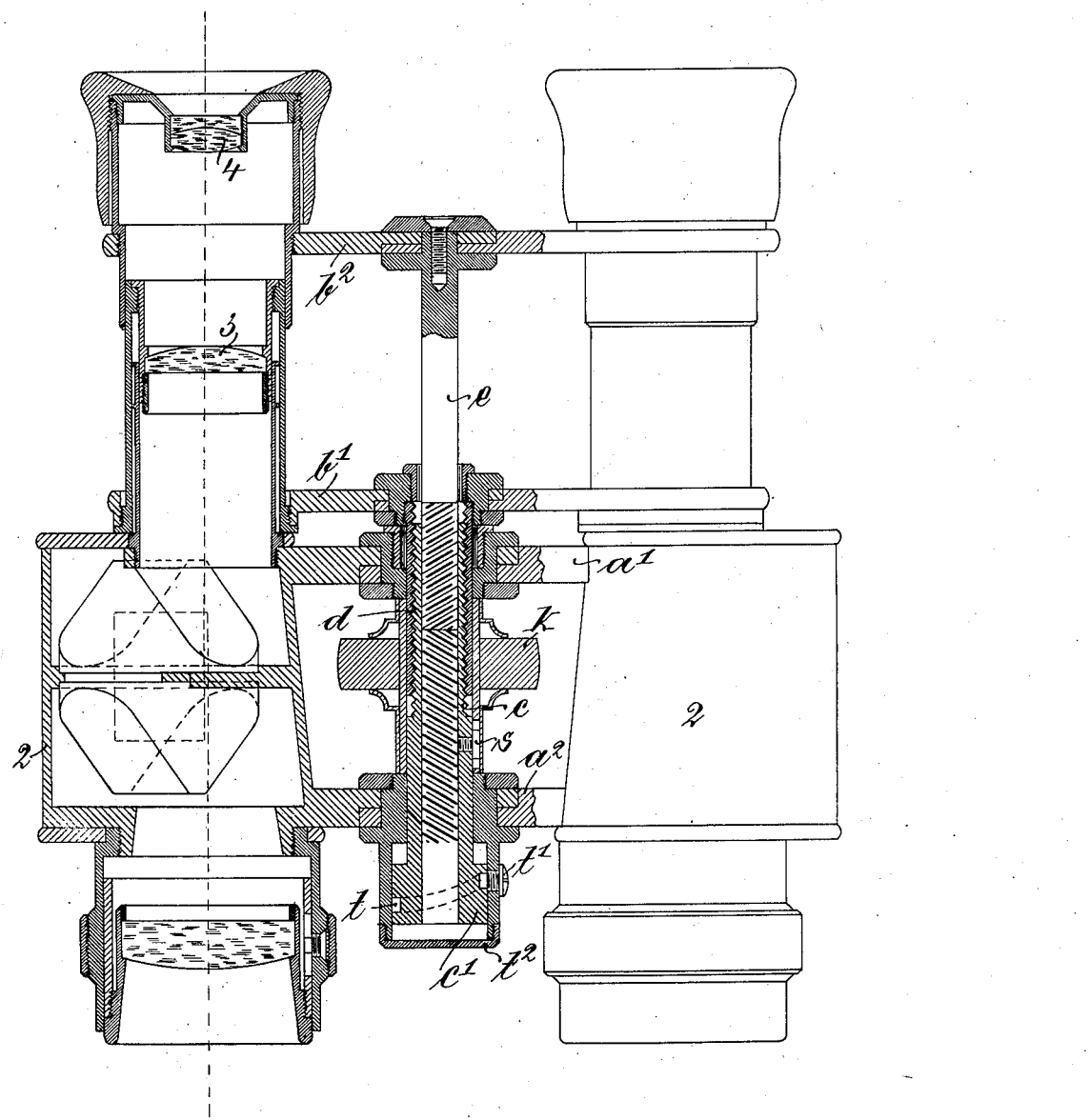

KARL MARTIN AND GEORG STIEGE, OF RATHENOW, GERMANY, ASSIGNORS TO THE COMPANY EMIL BUSCH, ACTIENGESELLSCHAFT, OPTISCHE INDUSTRIE, OF RATHENOW, GERMANY.

BINOCULAR.

937,834.  Specification of Letters Patent.  Patented Oct. 26, 1909.

Application filed January 11, 1909. Serial No. 471,828.

*To all whom it may concern:*

Be it known that we, KARL MARTIN and GEORG STIEGE, subjects of the King of Prussia, German Emperor, and residents of Rathenow, in the German Empire, have invented certain new and useful Improvements Relating to Binoculars, of which the following is a specification.

This invention relates to binoculars in which the eye-piece is formed of two lenses adapted to be adjusted so as to secure variable magnification within certain limits. With binoculars of this kind in order to obtain good definition it is necessary that the eye-piece receive a two-fold motion; one motion for the purpose of adjusting the eye-piece lenses to obtain the desired magnification and then a second motion of the entire eye-piece with reference to the objective in order to secure the original clear definition. For this purpose devices have already been proposed which employed a worm gear having a changing pitch of screw, but such devices are difficult to manufacture and unsatisfactory.

The object of the present invention is to provide simple and effective means for obtaining the necessary non-uniformity in the motions, that is to say, the two-fold motion described above. For this purpose the lenses of the eye-piece are adjusted from a rotatable member co-acting with screws and this rotatable member is itself axially moved during rotation by means of a correction cam. The axial motion of the rotatable member is of course small and by making the cam of a comparatively large diameter this correction motion may be obtained with much greater accuracy than was possible in former constructions.

The accompanying drawing is a longitudinal section through the operating gear for effecting the adjustment of binoculars according to the present invention. The bodies 2 of the binocular are carried by the bridge-pieces $a'$ and $a^2$ while the separate lenses 3 and 4 of the eye-piece are carried by the bridge-pieces $b'$ and $b^2$. The bridge-piece $b'$ has fixed to it an internally threaded tube $d$ while the bridge-piece $b^2$ has fixed to it a solid spindle $e$. The threads on the solid spindle $e$ and the hollow tube $d$ are oppositely handed. With both the screw threads described there simultaneously engages a threaded member $c$ which is rotated by means of a milled wheel $k$. The milled wheel $k$ is fixed by cementing or the like to a sleeve surrounding the hollow threaded member $d$ and a pin $s$ fixed in the rotatable screw $c$ engages with its head in a slot on this sleeve. The slot in which the pin $s$ engages is elongated so as to permit axial motion of the rotatable member $c$. In this way it will be seen that the rotatable member $c$ is caused to follow the rotary motion of the milled wheel $k$ but at the same time may be moved axially. When moved axially the rotatable member $c$ carries with it both the hollow threaded member $d$ and the solid spindle $e$ and thereby both the bridge-pieces $b'$ and $b^2$. This axial movement of the rotatable member $c$ is secured by means of a cam $c'$ formed on the end of the rotatable member $c$ and provided with a screw formed or spiral groove $t$ in which there engages the point of a pin $t'$. The pin $t'$ is fixed to a cap $t^2$ attached to a frame $a^2$. With this construction the cam groove $t$ effects the necessary correction in the position of the eye-piece with reference to the objective for the purpose of obtaining clear definition.

We claim:

1. A binocular having in combination with the objective lenses and eye-pieces, each of said eye-pieces having two relatively adjustable lenses, threaded members coupled to the corresponding lenses of each of the eye-pieces, a member simultaneously engaging said threaded members to effect adjustment of said lenses, and means for moving said engaging member bodily simultaneously with the eye-piece lenses and in the amount and direction to effect the necessary correction for clear definition.

2. A binocular having in combination objective lenses, a frame supporting said lenses, eye-pieces having each two relatively adjustable lenses, bridge-pieces carrying said eye-piece lenses, threaded members connected to said bridge-pieces, a rotatable member simultaneously engaging said threaded members, said rotatable member being slidable along its axis of rotation and cam means for moving said rotatable member axially during its rotation.

3. A binocular having in combination with the frame tubes, objective lenses mounted in said tubes, eye-pieces composed each of two lenses adjustably mounted relatively to one another, two bridge-pieces by which said lenses are supported, a solid threaded member fixed to one of said bridge-pieces, and a hollow threaded member fixed to the other, an internally and externally threaded member engaging simultaneously with said solid and hollow threaded members and axially slidable, a cam having an inclined spiral groove therein formed with said rotatable member and a pin carried by the frame of the binocular and engaging with its point in said cam groove.

In witness whereof we have hereunto set our hands in the presence of two witnesses.

KARL MARTIN.
GEORG STIEGE.

Witnesses:
 HENRY HASPER,
 WOLDEMAR HAUPT.